United States Patent Office 3,000,966
Patented Sept. 19, 1961

3,000,966
METHOD OF PREPARING POLYNITRO COMPOUNDS
Karl Klager, Monrovia, Calif., assignor, by mesne assignments, to Aerojet-General Corporation, Azusa, Calif., a corporation of Ohio
No Drawing. Filed Oct. 1, 1952, Ser. No. 312,651
3 Claims. (Cl. 260—644)

This invention relates to polynitro compounds and in particular to a process for forming the same.

The object of my invention is to provide an efficient procedure for the preparation of polynitro compounds from mono nitro compounds.

A further object of the invention is to provide a procedure for the formation of polynitro compounds in which the product is isolated from the reaction mixture without previous isolation of intermediates.

This application is a divisional application of the parent case, Serial No. 242,437, filed August 17, 1951, entitled "Composition of Matter and Method" by Karl Klager.

Heretofore polynitro compounds have been formed in the laboratory by an oxidative nitration process. When this process is used on a small scale it gives excellent yields and is relatively simple to perform. However, when it is attempted to apply the process to produce larger quantities, even when the amount is as small as 250 grams, the yields begin to drop far below a practical level.

Previous methods for the preparation of polynitro compounds were essentially as follows: A mononitro compound is converted to its aci-salt with an alkali metal hydroxide such as sodium or potassium hydroxide and this is then allowed to form a complex with sodium nitrite. To this complex is then added a solution of silver nitrate as rapidly as is possible, and the resultant product is isolated from the reaction mixture after removal of the precipitated metallic silver. The yields of product, however, fall off rapidly as the scale of reaction is increased. This is due to the physical limitations that govern the rate at which the silver nitrate can be added. According to my invention, I have discovered that a satisfactory yield, far superior to anything heretofore attainable, will result when my modified process is employed.

I have discovered that for satisfactory yields the reaction must be carried out within a limited range of the pH. I have found that for satisfactory yields the pH at which reaction occurs must be between 4 and 5. Using the procedure heretofore used such conditions are impossible to maintain particularly on a large scale. In the former procedure the pH of an aci-salt of a nitro compound at the start of the process is generally between 8 and 10 and pH is not essentially lowered when sodium nitrite is added. The addition of the silver nitrate solution, which has normally a pH in the range between 4 to 5, will cause a gradual pH change from a high to a low value, unless the silver nitrate can be added "all at once" and thereby cause a rapid drop in pH to the lower level. This has not been possible by the older procedure. Therefore, using the old procedure most of the reaction will occur at a pH between 5 and 10, with very little of the reaction taking place at the lower range, and under such conditions only very poor yields of product are recovered.

According to my invention, the improvement in the process occurs due to the maintenance of a pH between 4 and 5 during all stages of the reaction. In my process the complex mixture of aci-nitro salt and sodium nitrite is added to a silver nitrate solution at a pH between 4 and 5 instead of adding the silver nitrate solution to the complex mixture of aci-salt and sodium nitrite which from the nature of this system must necessarily be outside of these specified pH limits. The reaction by my procedure is initiated at a pH between 4 and 5 and the entire reaction occurs at this value. The low pH permits the reaction to reach completion in a relatively short time and produces yields which are many times greater than any obtainable by the former process.

The reaction employed in my process comprises reacting a nitro aliphatic compound with sodium or potassium hydroxide to form the corresponding aci-metal nitro salt. Sodium nitrite solution is added thereby forming a complex mixture with the aci-sodium nitro salt. The sodium nitrite aci-sodium nitro salt mixture is then added to a solution of silver nitrate with continued stirring. The reaction is best described by the following equation:

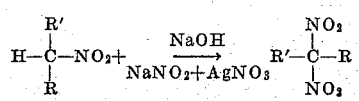

In the above Equation R may be hydrogen, any aliphatic radical, cyclo aliphatic radical or a functionally substituted derivative of any one of these radicals and R' may be hydrogen, any aliphatic radical, cyclo aliphatic radical or a functionally substituted derivative of any one of the radicals. R and R' may be the same or different radicals of the above groups.

The process can be best described by referring to specific procedure setting forth the formation of specific compounds which describe the manner in which the reaction proceeds.

Examples of nitro compounds used in my invention are: 2-nitroethane, 2-nitropropane, 2-nitrobutane, 2-nitroethanol, 2-nitropropanol, 2-nitrobutanol, 1-nitrocyclopentane, 1-nitrocyclohexane, endo-methylene - 2 - nitrocyclohexane and endo-nitroethylene anthracene. If these nitro compounds were employed in the above reaction, the following compounds would be formed, respectively: 2,2-dinitroethane, 2,2-dinitropropane, 2,2 - dinitrobutane, 1,1 - dinitrocyclopentane, 1,1 - dinitrocyclohexane, endo- 2,2'-dinitrocyclohexane and endo-dinitroethylene anthracene.

*Formation of 2,2-dinitropropane*

A 3-necked reactor provided with a stirrer and thermometer is charged with one mole sodium hydroxide dissolved in water. To this solution is added one mole of 2-nitropropane. The mixture is heated to 70° C. until the solution is complete. After cooling to room temperature 500 ml. of water is added and the solution of one mole of sodium nitrite dissolved in water is introduced.

A second 3-necked reactor provided with a stirrer and thermometer is charged with a solution of 2 moles of silver nitrate dissolved in approximately 1200 ml. of water. The solution is cooled to about +6° C. Into this cold silver nitrate solution the mixture obtained by stirring the first reaction is introduced. A white precipitate forms which soon precipitates as metallic silver. The temperature is then allowed to rise to 24° C. The end pH of the solution is about 5. After 30 minutes' stirring the precipitate is filtered and washed with water. The silver mass is then extracted with ether, the water solution being extracted once more with ether. The combined ether solution is dried over sodium sulfate and the ether evaporated. The yield of 2,2-dinitropropane from this process is 121 grams which corresponds to 90.5% of the theoretical value. The melting point of 2,2-dinitropropane thus obtained is between 50–53° C.

An advantage of my process is that there is no substantial loss of the costly silver in the process since it is not necessary to convert the precipitated silver to crystalline silver nitrate. In my process the precipitated silver is dissolved in an excess of $HNO_3$ and raised to a pH of 4 by the addition of any suitable hydroxide. This puts the silver in condition for reuse in the next batch.

I have shown by my novel process that a compound such as 2,2-dinitropropane may be made in large quantities and with good yields. Heretofore all attempts to make this compound have required a roundabout procedure and the ultimate yield of the material is usually too low to be of any commercial value.

According to my procedure, I have eliminated all of the above difficulties and have succeeded in providing a cheap and quick process whereby polynitro compounds may be produced on a large scale at low cost. Furthermore, the process opens the way to production of a large number of compounds, which have been extremely difficult to produce in the past, such as methyl 4,4-dinitroheptanoate. This compound can also be prepared by starting directly from nitromethane in the manner described above.

I claim:

1. A process for the formation of 2,2-dinitropropane which comprises reacting one mole of nitropropane with one mole of sodium hydroxide dissolved in water, heating the mixture to 70° C. until the solution is complete, cooling the mixture at room temperature, adding water to the solution and adding to the mixture one mole of sodium nitrite dissolved in water, adding the sodium nitrite mixture to a solution of 2 moles of silver nitrate dissolved in water in which the pH has been adjusted to between 4 and 5, carrying out the entire reaction at this pH, maintaining the temperature of the silver nitrate at about 6° C., continuing stirring the mixture for about one hour, allowing the temperature to rise to room temperature and then extracting the solution with ether, drying the ether extract over sodium sulphate and evaporating the ether under reduced pressure.

2. The method of preparing a polynitro compound having the formula:

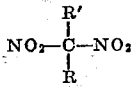

wherein R and R' are radicals selected from the group consisting of hydrogen, lower alkyl, monocyclic alkyl and lower hydroxyalkyl radicals, which comprises adding an alkali metal nitrite to a mixture of an alkali metal hydroxide and a nitro compound having the formula:

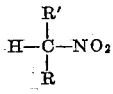

wherein R and R' are as defined above, and subsequently introducing the resultant nitrite complex into a solution of silver nitrate while maintaining the pH in the range of from about 4.0 to 5.0.

3. The method of preparing 2,2-dinitropropane which comprises adding sodium nitrite to a mixture of sodium hydroxide and 2-nitropropane, subsequently introducing the resultant nitrite complex into a solution of silver nitrate while maintaining the pH in the range of from about 4.0 to 5.0.

References Cited in the file of this patent

UNITED STATES PATENTS 2,132,352    Hoss _____ Oct. 4, 1938

FOREIGN PATENTS 397,601    Germany _____ July 1, 1924